United States Patent

[11] 3,610,557

| [72] | Inventor | Walter E. Fellers<br>Los Angeles, Calif. |
|---|---|---|
| [21] | Appl. No. | 878,037 |
| [22] | Filed | Nov. 19, 1969 |
| [45] | Patented | Oct. 5, 1971 |
| [73] | Assignee | Northrop Corporation<br>Beverly Hills, Calif. |

[54] SPEED BRAKE FOR AIRCRAFT
2 Claims, 4 Drawing Figs.

| [52] | U.S. Cl. | 244/113 |
|---|---|---|
| [51] | Int. Cl. | B64c 9/32 |
| [50] | Field of Search | 244/113,<br>110, 110 D |

[56] References Cited

UNITED STATES PATENTS

| 1,412,807 | 4/1922 | Kraft | 244/113 UX |
| 2,559,823 | 7/1951 | Klose | 244/113 X |
| 3,058,702 | 10/1962 | Sharples et al. | 244/113 X |

FOREIGN PATENTS

| 435,636 | 12/1911 | France | 244/113 |
| 771,114 | 7/1934 | France | 244/113 |
| 249,990 | 8/1912 | Germany | 244/113 |
| 1,249,702 | 9/1967 | Germany | 244/113 |
| 402,645 | 12/1933 | Great Britain | 244/113 |

OTHER REFERENCES

Flight. Vol. 65, No. 2369, June 18, 1954, page 798. " Hurel-Dubois H. D. 32."

*Primary Examiner*—Milton Buchler
*Assistant Examiner*—Paul E. Sauberer
*Attorneys*—Harold L. Fox and William M. Graham ABSTRACT: An aircraft incorporating a pair of ventral fins equally spaced on each side of the aircraft's longitudinal axis providing dual functions, viz., directional stability and speed brakes.

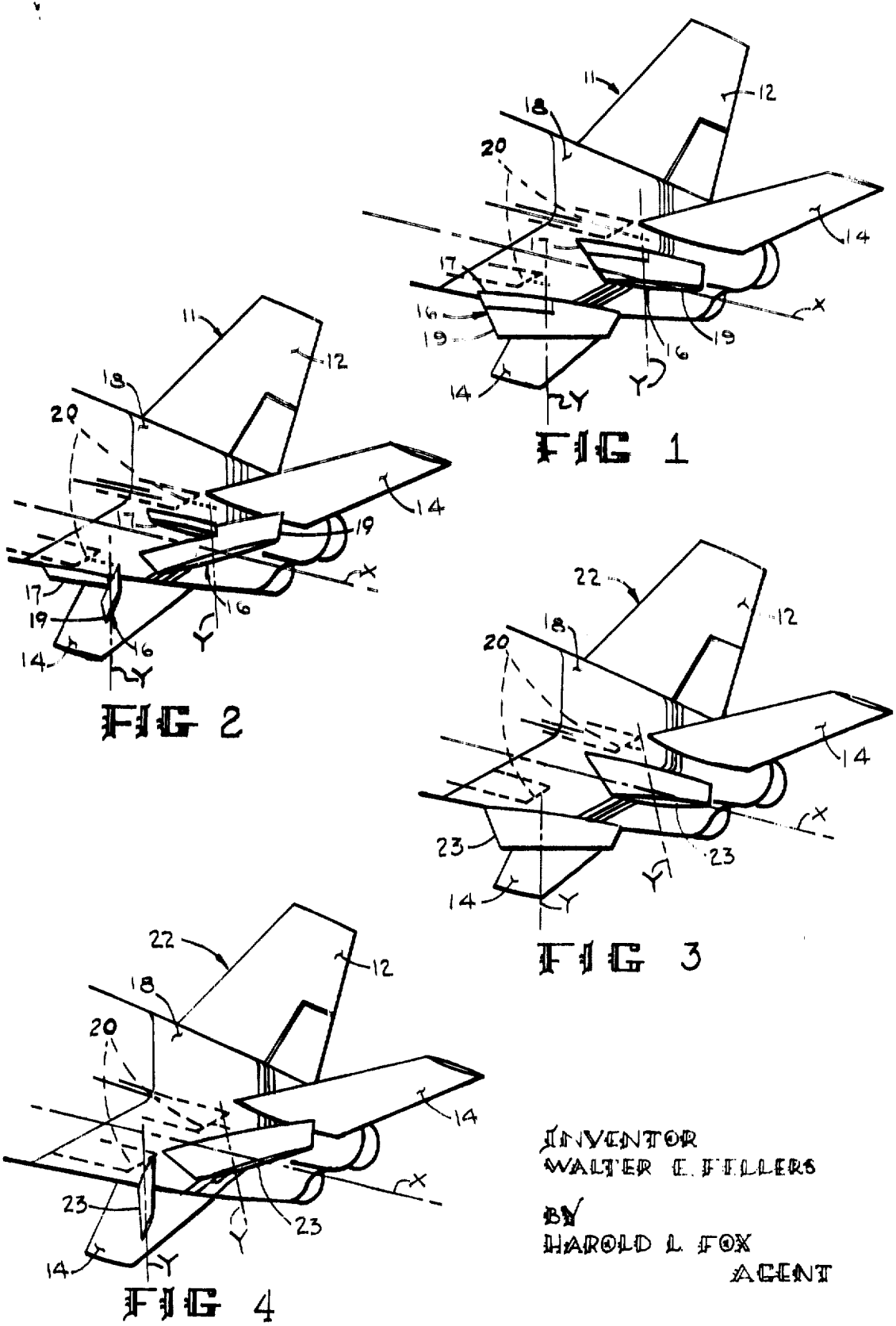

SPEED BRAKE FOR AIRCRAFT

The present invention relates to control surfaces for aircraft and more particularly to airplanes including a pair of ventral fins functioning primarily to impart directional stability and alternately providing speed brakes for an airplane on which the fins are mounted.

Ventral fins are well known and extensively utilized in the aircraft industry to provide directional stability for high-speed aircraft, however, to the best of applicant's knowledge ventral fins providing dual functions have not been proposed and/or utilized in aircraft construction to date.

Briefly the present invention relates to a tail assembly for a jet-type airplane (not shown) including a pair of ventral fins mounted equal distances on each side of the longitudinal axis of the airplane. In a preferred embodiment of the tail assembly the ventral fins include fixed and pivotal portions, the latter portions having primary and secondary positions. The lower portions of the fins when in the primary positions thereof, cooperate with the fixed potions to provide directional stability for the airplane on which they are mounted and, when in the secondary positions thereof, cooperate with each other to provide speed brakes for the airplane.

An object of the present invention is to disclose an aircraft having a pair of ventral fins providing dual functions.

Another object is to disclose an aircraft incorporating a pair of ventral fins providing directional stability and alternately speed brakes for an airplane on which the fins are mounted.

Another object is to disclose an aircraft incorporating a pair of ventral fins including fixed and pivotal portions and in which the fixed and pivotal portions cooperate to define streamlined structures functioning to provide directional stability and as speed brakes at such times as the fixed and pivotal portions do not cooperate to define streamlined structures.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGS. 1 and 2 are fragmentary perspective views of a referred embodiment of the lower aft portion of an aircraft incorporating a pair of ventral fins mounted and functioning as disclosed herein.

FIGS. 3 and 4 are views similar to FIGS. 1 and 2 of another embodiment of the ventral fins disclosed herein.

Referring to the drawings, a preferred embodiment of a tail assembly 11 of a jet-type airplane (not shown) is illustrated in FIGS. 1 and 2. The tail assembly 11 includes a vertical stabilizer, elevators and ventral fins 12, 14 and 16, respectively. Each of the ventral fins 16 include an upper portion 17 having a fixed relation with respect to the housing 18 of the tail assembly 11 and a lower portion 19 mounted on the housing 18 for pivotal movement thereon.

The fins 16 in their entirety are of streamlined configuration in longitudinal cross section, the portions 17 and 19 are also —for the most part—of streamlined configuration in longitudinal cross section. The upper portions 17, hereafter referred to as the fixed portions, are mounted on the housing 18 and have a fixed relation thereon. Their longitudinal axes have a parallel relation with respect to the longitudinal axis of the airplane as identified by the letter "X." The lower portions 19 are mounted for pivotal movement on the housing 18 about respective axes as identified by the letter "Y"

A shown in FIG. 1, the sides of the upper and lower portions 17 and 19, respectively, have an aligned relation and when in this position cooperating to define a near or true streamlined structure. In this position (FIG. 1) the upper and lower portions cooperate to define the fins 16 and impart directional stability to the airplane, this position of the lower portions 19 are referred to as the primary positions thereof. In this respect stop means (not shown) are provided insuring that the lower positions have reached their primary positions and will be maintained in these positions until altered therefrom upon command of the pilot of the aforementioned airplane.

Means are provided enabling the lower portions 19 to be pivotally moved from their primary positions (FIG. 1) to a secondary position (FIG. 2) in which they function as speed brakes. Stop or detent means (not shown) are also provided insuring that the lower portions 19 have reached and will be maintained in their secondary positions. In this respect cable or push-pull rod means 20 may be employed in effecting this movement.

The pivotal axes "y" or respective axes about which the lower portions rotate are located slightly forward of the aerodynamic center of pressure of the portions 19. Accordingly at such times as the portions 19 are pivotally moved from their primary to secondary positions it will be apparent that aerodynamic drag, acting upon the side surfaces of the portions 19, will nearly neutral each other. The same will be true at such times as the lower portions are returned to their primary positions. The loads are intentionally higher on the aft portions of the portions 19 so that if the actuating means ceases to function, the aerodynamic forces will return portions to the streamlined positions thereof.

The embodiment of the tail assembly 22 (FIGS. 3 and 4) is similar to design and function similarly as the embodiment shown in FIGS. 1 and 2 the only difference being that fins 23 are pivotally moved in their entirety, accordingly further explanation in connection with FIGS. 3 and 4 is not believed necessary.

Thus it will be seen that an aircraft incorporating ventral fins, providing dual functions and accomplishing the various objects of the invention as set forth above is disclosed.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims:

I claim:
1. In an aircraft the combination comprising:
   a. a tail assembly including a housing, vertical stabilizers, elevators and a pair of ventral fins;
   b. each of said ventral fins including upper and lower portions of elongated and substantially streamlined configuration;
   c. the upper portion being fixedly mounted on said housing and the longitudinal axis thereof and the longitudinal axis of said airplane having a parallel relation;
   d. and the lower portions being pivotally mounted on said housing for rotation between primary and secondary positions in which the respective outer surfaces of said lower portions forms a continuous streamlined surfaces with respect to the outer surfaces of the upper portion with which it is associated and a position in which the leading edges of said lower portions converge and the trailing edges diverge with respect to each other, respectively.
2. In an aircraft as set forth in claim 1:
   a. in which the axis of rotation of each of said lower portions is located ahead of the aerodynamic center of pressure of said lower portions.